(12) United States Patent
Schippers et al.

(10) Patent No.: US 10,113,572 B2
(45) Date of Patent: Oct. 30, 2018

(54) DEVICE HAVING TWO PARTS

(71) Applicant: KONINKLIJKE PHILIPS N.V., Eindhoven (NL)

(72) Inventors: David Schippers, Eindhoven (NL); Pritesh Patel, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 91 days.

(21) Appl. No.: 14/904,744

(22) PCT Filed: Jun. 4, 2015

(86) PCT No.: PCT/EP2015/062479
§ 371 (c)(1),
(2) Date: Jan. 13, 2016

(87) PCT Pub. No.: WO2015/193118
PCT Pub. Date: Dec. 23, 2015

(65) Prior Publication Data
US 2017/0097028 A1   Apr. 6, 2017

(30) Foreign Application Priority Data

Jun. 17, 2014 (EP) .................................. 14172758

(51) Int. Cl.
*F16B 7/04* (2006.01)
*A47L 5/28* (2006.01)
*A47L 9/00* (2006.01)

(52) U.S. Cl.
CPC ............... *F16B 7/042* (2013.01); *A47L 5/28* (2013.01); *A47L 9/00* (2013.01)

(58) Field of Classification Search
CPC ......... Y10T 403/1666; Y10T 403/1674; Y10T 403/553; Y10T 403/587; Y10T 403/59;
(Continued)

(56) References Cited

U.S. PATENT DOCUMENTS

| 283,380 A | * | 8/1883 | Cooper | ................. E05B 1/0007 |
| | | | | 292/347 |
| 1,672,419 A | * | 6/1928 | Lehman | .................... E06B 3/96 |
| | | | | 403/401 |

(Continued)

FOREIGN PATENT DOCUMENTS

| DE | 202012005714 U | | 9/2013 | | |
| EP | 0614017 B1 | * | 8/1997 | ............... | E01C 5/16 |

(Continued)

OTHER PUBLICATIONS

Aqua Trio User Manuel, Koninklijke Philips Electronics N.V., 2012, pp. 1-126.

*Primary Examiner* — Matthieu F Setliff

(57) ABSTRACT

A device includes a first part and a second part. The first part comprises a first fastening tool (FT1) and a first receptor (R1). The second part comprises a second receptor (R2) for engaging with the first fastening tool (FT1), and a movable latch (L) for engaging with the first receptor (R1). A single act of engaging the first fastening tool (FT1) with the second receptor (R2) to establish a first connection between the first and second parts, also makes the movable latch (L) engage with the first receptor (R1) to establish a second connection between the first and second parts. The second connection is spaced apart from the first connection. Both the first and second connections result from operating only the first fastening tool (FT1).

6 Claims, 1 Drawing Sheet

(58) Field of Classification Search
CPC ............. Y10T 403/591; Y10T 403/593; Y10T 403/598; Y10T 403/599; Y10T 403/60; Y10T 403/602; Y10T 403/604; Y10T 403/7066; Y10T 403/7067; Y10T 403/75; F16B 5/0024; F16B 5/0044; F16B 5/0052; F16B 5/0072; F16B 5/0088; F16B 5/0092; F16B 5/02; F16B 5/10; F16B 7/042; F16B 7/18; F16B 7/182; F16B 7/187; F16B 7/22; F16B 9/026; F16B 12/10; F16B 12/24; F16B 12/40; F16B 2012/106
USPC .................................... 403/DIG. 10, DIG. 14
See application file for complete search history.

(56) References Cited

U.S. PATENT DOCUMENTS

| | | | | |
|---|---|---|---|---|
| 1,821,182 | A * | 9/1931 | Hoppes | F16B 7/025 403/205 |
| 3,633,949 | A * | 1/1972 | Pfluger | F16B 2/14 403/343 |
| 4,076,438 | A * | 2/1978 | Bos | E06B 3/982 403/297 |
| 4,080,081 | A * | 3/1978 | Wah | F16B 7/18 403/237 |
| 4,145,844 | A * | 3/1979 | Kaspar | A47F 3/043 403/231 |
| 4,190,375 | A * | 2/1980 | Berry | F16B 7/025 403/12 |
| 4,603,998 | A * | 8/1986 | Bober | F16D 1/10 403/316 |
| 4,943,196 | A * | 7/1990 | Dahl | F16B 19/05 403/408.1 |
| 5,193,929 | A * | 3/1993 | Kahn | F16B 7/0413 403/14 |
| 5,667,327 | A * | 9/1997 | Salice | F16B 12/2009 403/231 |
| 5,676,487 | A * | 10/1997 | Lautenschlager | F16B 12/2009 403/231 |
| 5,964,547 | A * | 10/1999 | Brinkley | E02F 9/2825 37/456 |
| 6,042,298 | A * | 3/2000 | Mastrogiannis | E06B 3/9725 403/231 |
| 6,053,656 | A * | 4/2000 | Heilig | B62D 1/10 403/362 |
| 6,155,741 | A * | 12/2000 | Took | E06C 7/086 403/260 |
| 6,626,604 | B1 * | 9/2003 | Pinarello | B62K 19/18 280/278 |
| 6,669,399 | B2 * | 12/2003 | Janek, Jr. | B21D 28/34 403/374.2 |
| 6,764,245 | B2 * | 7/2004 | Popovski | F16L 37/0466 403/256 |
| 7,144,181 | B2 * | 12/2006 | Areh | A47J 43/07 403/109.3 |
| 7,296,855 | B1 * | 11/2007 | Link | A47C 7/402 248/423 |
| 7,682,100 | B2 * | 3/2010 | Duval | F16B 12/2027 312/111 |
| D646,858 | S | 10/2011 | Smith | |
| 9,212,675 | B2 * | 12/2015 | Oetlinger | F16B 7/182 |
| 9,302,488 | B2 | 4/2016 | Tamaki | |
| 2011/0121560 | A1 * | 5/2011 | Readman | F16B 12/24 285/82 |
| 2013/0192038 | A1 * | 8/2013 | Vullings | F16B 5/0642 29/426.2 |
| 2015/0316086 | A1 | 11/2015 | Urban | |

FOREIGN PATENT DOCUMENTS

| | | |
|---|---|---|
| ES | 1016914 U | 12/1991 |
| GB | 2150817 A | 7/1985 |
| JP | 2011045478 A | 3/2011 |
| JP | 2012111265 A | 6/2012 |
| WO | 03090504 A1 | 10/2003 |

\* cited by examiner

DEVICE HAVING TWO PARTS

This application is the U.S. National Phase application under 35 U.S.C. § 371 of International Application No. PCT/EP2015/062479, filed on Jun. 4, 2015, which claims the benefit of International Application No. 14172758.6 filed on Jun. 7, 2014. These applications are hereby incorporated by reference herein.

FIELD OF THE INVENTION

The invention relates to a device having two parts to be connected together.

BACKGROUND OF THE INVENTION

In the field of vacuum cleaners, a clear distinction can be made between cylinder and upright architectures. The cylinder vacuum cleaners are vacuum cleaners with a canister for dust management and a suction motor. Via a hose, and a nozzle, the dust enters the vacuum cleaner. This configuration is easily packed in a box. The product volume to box volume ratio is in this case in an acceptable range.

The upright vacuum cleaner (e.g. the Philips Aquatrio floor cleaning device) has an architecture in which a stick is attached to a nozzle. Often the stick facilitates the space for dust management and the suction motor. The total envelope dimensions of such appliance are larger than a cylindrical architecture. The product volume box volume ratio is not at an acceptable value. This makes shipment and packaging expensive.

Therefore upright vacuum cleaners are provided with a detachable/foldable design, to improve the above mentioned ratio. The detachable connection is more compact and cost effective compared to a hinge construction, especially if the connection is only made after and before shipments.

The Philips Aquatrio floor cleaning device is shipped in two parts. Before first use, the two parts have to be connected. The two parts are not meant to be taken apart again. U.S. design patent USD646858 shows a dividing line between the two parts when mounted together, about in the middle of the upright part.

WO03/090504 discloses a housing module of an electric device, comprising an essentially tubular-shaped housing section which extends in a longitudinal direction, and a housing base which can be connected to the housing section by means of at least one connecting element which extends in the longitudinal direction, such as a screw, a pin, a rivet or similar. The connecting element extends in a fixed hole in the housing which is arranged in a flush manner with the associated pathways of the housing base, so that at least one hole is provided in a locking element which can be transversally displaced relative to the housing base. The locking element can be locked by means of a housing recess. In this prior art device, the user has to carry out three different actions, viz. pressing the housing base into the housing section to make the locking element engage with the housing recess, whereby a screw hole in the locking element is aligned with a screw opening in the housing base, and thereafter mounting the housing base to the locking element by means of a first screw, and mounting the housing base to the housing section by means of a second screw.

DE202012005714U discloses a holder for a profiled rail, comprising a main body, a clamping element and a screw connection. The main body comprises a bearing surface for placement of a profiled rail and a holding-down strip for holding down a holding edge of the profiled rail against the bearing surface, and contains a first opening. The clamping element is able to clamp the profiled rail against the main body by means of the screw connection. While the screw connection results in the holder simultaneously being fixed to two profiled rails, a disadvantage is that the two profiled rails need an intermediate element, viz. the holder, to be connected together. Also, the profiled rail that is caught by the holding-down strip is only caught by that holding-down strip, so that in effect, there is only one connection at one position between the two profiled rails.

SUMMARY OF THE INVENTION

It is, inter alia, an object of the invention to provide an alternative way to connect parts together. The invention is defined by the independent claims. Advantageous embodiments are defined in the dependent claims.

One aspect of the invention provides a device comprising a first part and a second part that comprise a first fastening tool; a first receptor; a second receptor for engaging with the first fastening tool, and a movable latch for engaging with the first receptor, wherein said first and second parts are arranged for being connected together by a single act of engaging the first fastening tool with the second receptor to establish a first connection between the first and second parts, and to make the movable latch engage with the first receptor to establish a second connection between the first and second parts, the second connection being spaced apart from the first connection, whereby both said first and second connections result from operating only said first fastening tool.

The invention provides the advantage that the two parts are connected in two different ways, while yet only the first fastening tool needs to be operated by the user. The length of the movable latch ensures that the two connections are spaced apart, resulting in a very stable connection.

In an embodiment, the first part comprises the first fastening tool and the first receptor, and the second part comprises the second receptor and the movable latch.

The second receptor may receive the first fastening tool at an angle with regard to a contact area between the first and second parts to create proper stiffness and to counter relaxation effects.

The movable latch may have a slanted side engaging with the first fastening tool when the first fastening tool engages with the second receptor, whereby the movable latch is moved towards the first receptor. This slanted side of the movable latch nicely engages with the first fastening tool that is received by the second receptor at an angle. The first fastening tool may include a bolt, and the second receptor may include a nut. This way of connection is easy for a user and also allows an easy disassembly when needed. An alternative first fastening tool could be a bayonet.

The movable latch may engage with the first receptor against spring pressure by a spring. This ensures that when the first fastening tool and the second receptor are disengaged (e.g. by the user unscrewing the bolt), not only the first connection but also the second connection is loosened.

The first receptor may include a rim, which together with the latch provides a trustworthy second connection.

The first fastening tool and the second receptor may ensure the first connection at about a first side of the device, while the movable latch and the first receptor may ensure the second connection at a second side of the device opposite to the first side. In this way the first and second connection are maximally spaced apart, thereby achieving maximal stability.

These and other aspects of the invention will be apparent from and elucidated with reference to the embodiments described hereinafter.

DETAILED DESCRIPTION OF EMBODIMENTS

Figure 1:
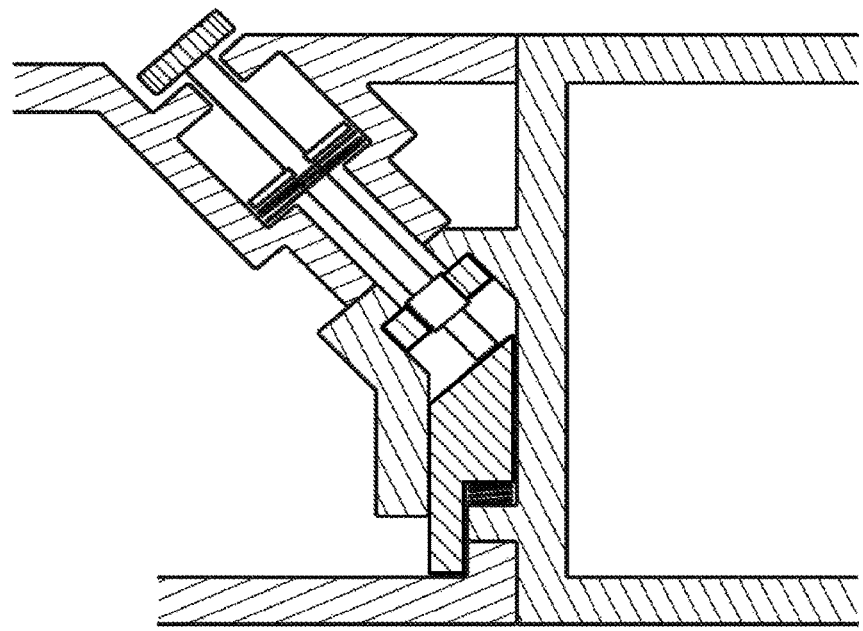
FIG. 1 shows an embodiment of the device when the first part is not connected to the second part.

A preferred embodiment of this invention describes a measure to fix two parts of a product by a user operating just one bolt. The invention includes a mechanism that increases the distance between contact points and thus creating more stiff connections.

A preferred embodiment of the invention consists of a connection by a bolt B with additional locking features activated during the fastening of the bolt B. The end of the bolt B makes a wedge move to further lock down the connection. This ensures that in all 6 degrees of freedom (3 rotational directions and 3 movement directions) no movement is possible anymore, and it increases the total connection stiffness.

While a connection with consisting of a single bolt B would basically suffice to hold the parts together, for the following reason additional measures are required. The connection should withstand high torques and loads, because the connection is in the middle of a stick vacuum cleaner. Without further measures, a single bolt can only equally distribute forces on contact areas if it is mounted perpendicularly and centered in the mounting surface. In most cases of a stick which needs to be connected in the middle, this is not possible.

Each connection should stay connected over time without increasing play. In a bolt connection a form of pretension is required. The contact surfaces remove play when a pretension (pressure) is present. Preferably, the connection should also be detachable for transport or storing purposes. Therefore the connection is preferably easily detachable with a minimal amount of steps.

A preferred embodiment of this invention secures all the degrees of freedom by the user just screwing one bolt B, which is detachable. The bolt B cannot get lost because is fixed with a clip ring CR in the construction. The end of the bolt B drives a latch L formed by an internal wedge to make the contact points at a larger distance with increased contact pressure. The wedge is spring-loaded by means of a spring S2, so it will return when the connection is removed again.

This solution has the following advantages compared to a standard bolt connection. It ensures that in all degrees of freedom no movement is possible anymore by contact point over a relative large area, increasing the total stiffness by actuating a wedge and applying pretension on contact surfaces. The wedge is spring-loaded and thus will retract to its original position, therefore the connection is also detachable. The solution is suitable for each cross sectional shape (multiple X-section shapes). The assembly is performed with only one screw, which is placed at angle to create proper stiffness and to counter relaxation effects.

The connection is designed to keep two parts rigidly together, with tensile, compression and torsion loads in multiple directions applied. This connection can also be applied on different products with different load cases. By placing the bolt B at an angle of e.g. 30°, the fastening feature is orientated partially in the load direction. Combined with the contact faces, this ensures that in all degrees of freedom no movement is possible anymore.

Figure 2:
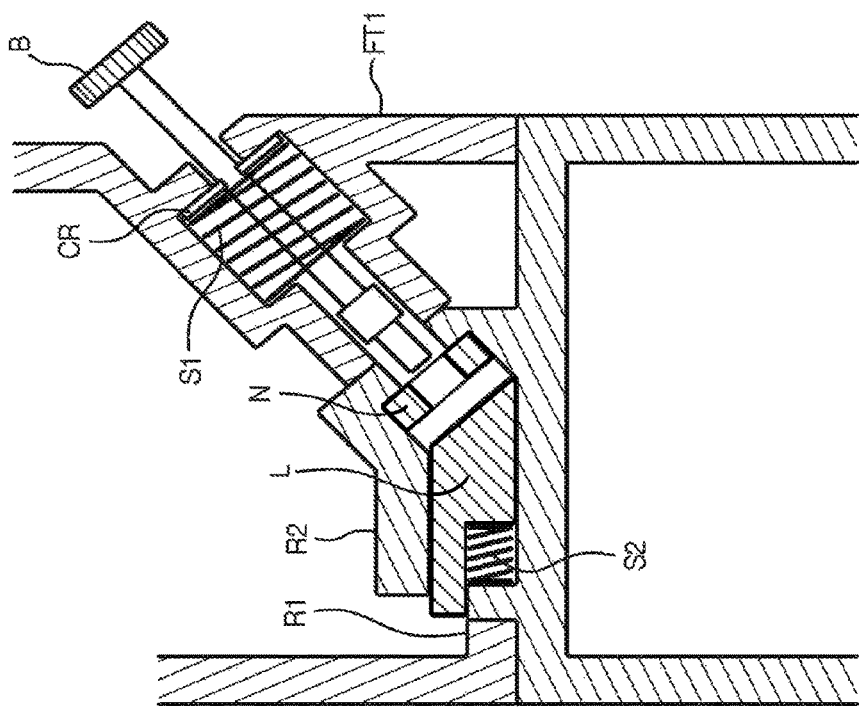
FIG. 2 shows an embodiment of the device when the first part is connected to the second part.

However, if just a bolt B is used without further measures, the maximum forces and stiffness are still limited, especially at larger distances from the bolt connection. With a wedge added in the construction, additional contact points can be made which do not rely on the pretension created by the bolt B. The bolt end is driving the wedge to the locking position and securing the connection. When the bolt B is not placed and thus the upper part is not placed, the wedge is inside the lower part geometry. If the upper part is placed and the bolt B is tightened, the wedge slides into the cut-out geometry in the upper part, securing the position, as shown in FIG. 2. By making use of the wedge, the two parts are fixed together at two different positions. One end is fixed by the wedge and not by the lower pretension resulted from the bolt connection. The wedge is close to the one end while the bolt connection is close to the other end, and thus creating sufficient forces at a large distance from each other. This leads to a higher stiffness.

This embodiment of the invention consists of an upper and lower part. In the upper part a first fastening tool FT1 is integrated. The first fastening tool FT1 is formed by a bolt B that is locked by a clip ring CR. This way the bolt B cannot become loose. The bolt B is spring-loaded by a spring S1, in such a way that it has no interference when positioned on top of the lower part. The spring S1 is specified in such a way that the bolt B can be pushed in and fastened without much effort.

The lower part has a second receptor R2 comprising a fixed nut N in a plastic part. The nut N is fixed and will not rotate when the bolt B is fixed into it. Behind the fixed nut N, there is space for the bolt's full length. The bolt B will extend beyond the nut N, in order to drive a latch L formed by a wedge into the locking position.

When the bolt B is not fixed, the wedge is situated in this space. When the upper part is positioned on the lower part, the wedge is still in the starting position, as shown in FIG. 1. When the bolt B is turned into the nut N, and comes through, the bolt B moves the wedge forward into is end position, as shown in FIG. 2, where it engages a first receptor R1 formed by a rim.

The bolt B has a step shape, to secure the end stop towards the nut N. When the bolt B is fully mounted, there is a small interference designed in contact surfaces. This provides the pretension by the forces distributed from the bolt pretension towards the upper/lower part contact points.

When the bolt B is turned loose again, the wedge will move back as well. Behind the wedge, a spring S2 is placed to provide this move back function. When the wedge is fully retracted, the upper part can be separated from the lower part.

It should be noted that the above-mentioned embodiments illustrate rather than limit the invention, and that those skilled in the art will be able to design many alternative embodiments without departing from the scope of the appended claims. The connecting method of the present invention can be applied to all upright vacuum cleaners, wet cleaners or appliances with detachable hand sticks so as to allow them to be shipped or stored using a more convenient packaging shape. It is also suitable for other products which need to be detachable or opened. The shape of the interface can also vary, as well as the wedge shapes, able to reach to any edge and in any direction, based on the contact angle of the wedge and the screw. The slide can also have a split shape, securing the interface at multiple locations. Instead of a bolt, a screw, a mounting pin, eccentric pin, or bayonet connection can be used to make such a connection.

While in the shown embodiment, the movable latch L is part of the second part, it is alternatively possible that the movable latch L is part of the first part, e.g. when the separation surface between the two parts is not flat but has some elevated parts. A dented separation between the two parts may further assist in achieving a good immovable connection between the two parts in the mounted state.

While in the shown embodiment, the movable latch L is shifted into the first receptor R1, it is alternatively possible that the movable latch L rotates around an axis. Alternatively, the movable latch L may have multiple protrusions and the first receptor R1 may have multiple places to engage with these protrusions. Or, the first receptor R1 may have at least one protrusion, and the movable latch L may have at least one opening to engage with this at least one protrusion.

The angle at which the first fastening tool FT1 is received by the second receptor R2 may be anything between 10 and 80 degrees, but is preferably between 20 and 45 degrees, such as 30 degrees, as the steeper the angle is, the more difficult it is for the first fastening device FT1 to make the movable latch L engage with the first receptor R1.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A device comprising:
a first part that comprises a first fastening tool (FT1) and a first receptor (R1); and
a second part that comprises a second receptor (R2) for engaging with the first fastening tool (FT1), and a movable latch (L) for engaging with the first receptor (R1),
wherein said first and second parts are arranged for being connected together by a single act of engaging the first fastening tool (FT1) with the second receptor (R2) to establish a first connection between the first and second parts, and to make the movable latch (L) engage with the first receptor (R1) to establish a second connection between the first and second parts, the second connection being spaced apart from the first connection, wherein both said first and second connections are completed in response to operating only said first fastening tool (FT1), wherein the first fastening tool (FT1) includes a bolt (B) locked by a clip ring (CR) in its construction to prevent the bolt (B) from becoming loose from the first fastening tool (FT1), wherein the first fastening tool (FT1) further includes a spring (S1), wherein the bolt (B) is spring-loaded via the spring (S1) and the clip ring (CR) so that the bolt (B) has no interference when the first part is positioned on top of the second part, and wherein the second receptor (R2) includes a nut (N), and further wherein the bolt (B) can be fastened to the nut (N) after the bolt (B) is pushed against the spring-loading of the spring (S1).

2. The device as claimed in claim 1, wherein the second receptor (R2) receives the first fastening tool (FT1) at an angle with regard to a contact area between the first and second parts.

3. The device as claimed in claim 2, wherein the movable latch (L) includes a slanted side configured to engage with the first fastening tool (FT1) in response to the first fastening tool (FT1) engaging the second receptor (R2), further wherein the movable latch (L) is moved towards the first receptor (R1) in response to the first fastening tool (FT1) further engaging the second receptor (R2).

4. The device as claimed in claim 1, wherein the movable latch (L) engages with the first receptor (R1) against spring pressure by a spring (S2).

5. The device as claimed in claim 1, wherein the first part includes a rim, and further wherein the first receptor (R1) comprises the rim.

6. The device as claimed in claim 1, wherein the first fastening tool (FT1) and the second receptor (R2) ensure the first connection near a first side of the device, and wherein the movable latch (L) and the first receptor (R1) ensure the second connection at a second side of the device, opposite to the first side.

\* \* \* \* \*